United States Patent Office 3,262,808
Patented July 26, 1966

3,262,808
METHOD OF COATING ORIENTED POLYPROPYLENE FILMS WITH HEAT SEALABLE COATINGS
Charles Hampden Crooks, Welwyn, and Anthony Graham Marshall Last, Welwyn Garden City, England, assignors to Imperial Chemical Industries Limited, London, England, a corporation of Great Britain
No Drawing. Filed Oct. 4, 1961, Ser. No. 142,767
Claims priority, application Great Britain Oct. 6, 1960, 34,318/60
10 Claims. (Cl. 117—47)

This invention relates to methods for making coated films of the crystallisable polymers and copolymers of alpha-olefines having at least 3 and preferably from 3–6 carbon atoms in the molecule, more particularly isotactic polypropylene.

This invention provides a method for the preparation of coated films of the said olefine polymers wherein a film of such polymer which has been stretched to orient it (preferably to biaxially orient it) but not heat set is subjected to a treatment as hereinafter defined to improve the bonding properties of its surface, the film is coated with a polymeric heat seal coating which can be heat sealed at a temperature below 170° C. as hereinafter defined, and is then heat set under conditions of time and temperature sufficient to dry the coating.

In this way a coated oriented polyolefine film having good adhesion of the coating to the film is obtained with the use of a minimum of machinery. A film which has been oriented and heat set may also be subjected to a treatment to improve the bonding properties of its surface and then coated, but the coating has to be dried, usually at a temperature above 100° C. while preventing undue or uneven contraction in the film thus involving extra, and expensive, drying machinery and a further stage in film manufacture in which the film may become damaged or contaminated, for instance, by dust.

The treatment by which the bonding properties of the film are improved is an oxidation treatment in which the surface of the film is oxidised, e.g., one of the following— exposure of the surface to ozone, e.g., while at a temperature above 100° C.; exposure of the surface to a high voltage electric stress accompanied by corona discharge in the presence of oxygen such as the treatment described in British specification No. 715,914; exposure of the surface in the presence of oxygen to ionising radiations such as ultra-violet X-, α-, γ-, or β-radiation, particularly at temperatures above 100° C., exposure of the surface to a flame for a time that is insufficient to cause distortion of the surface and general oxidative treatments such as treatment with mixtures of chromic and sulphuric acids, halogenation, treatment with nitric acid, such treatments being under conditions whereby free radicals are formed and can attack the surface of the film to initiate oxidation. The preferred treatment, because of its effectiveness and simplicity is the treatment by high voltage electric stress accompanied by corona discharge.

By a polymer heat seal coating is meant any polymer or copolymer which can be heat sealed in standard heat sealing equipment (see H. P. Zade, "Heat Sealing and High Frequency Welding of Plastics," Temple Press, London, 1959). Examples of such polymers and copolymers are vinylidene chloride/acrylonitrile copolymers, especially because they give the hardest coatings and best heat seal strengths and are particularly resistant to moisture and gas permeability those of between 80% and 95% by weight of vinylidene chloride and 0–20% unsaturated monomers such as itaconic acid, methacrylic acid and alkyl acrylates; polyvinyl alcohol; polyvinyl acetate, butadiene/acrylonitrile copolymers, methyl methacrylate/methacrylic acid copolymers, copolyesters of terephthalic acid and another dicarboxylic acid with a glycol, e.g. those containing not more than 4.0 molecular proportions of combined terephthalic acid to one molecular proportion of combined sebacic acid; N-alkoxy-methyl polyamides, gelatin, nitrocellulose, copolymers of vinylidene chloride and vinyl chloride, copolymers of vinyl acetate with vinyl chloride, copolymers of vinyl acetate with ethylene and copolymers of vinyl chloride with ethylene.

The polymeric heat seal coating may be applied by any method capable of giving a thin, substantially uniform coating. For example, it may be applied by known solution or dispersion coating techniques. For simplicity in the apparatus used, it is preferred to use the dispersion coating technique whereby an aqueous dispersion of the polymeric material stabilised by a suitable emulsifying agent is used. This eliminates the necessity for solvent removal and solvent recovery otherwise necessary when using solution coating techniques.

By heat setting is meant a treatment to increase its thermal dimensional stability in which the polyolefine film is heated while controlling or preventing changes in its dimensions and then cooled or allowed to cool. Preferably for speed and effectiveness, such a treatment is carried out at a temperature in the range 75° C. to the melting point (for polypropylene from 75° to 170° C.) and, if aqueous dispersion coating is used, to dry the coating effectively the temperature for polypropylene is in the range 130–165° C. The treatment is normally carried out for a time long enough for the film produced to have a linear shrinkage in any direction in the plane of the film of less than 6% when heated for one minute at 120° C. Linear shrinkage of up to 15% may be permitted during the heat setting treatment, such shrinkage being either lateral or longitudinal. Reference is made to our copending British application 40,313/60.

The heat setting may be carried out using a stenter and for simplicity and for the production of uniformly coated flat film having good wind up properties this is the preferred method. If the film has been coated on one side only the heat setting may be carried out over hot rollers or drums or, if tubular film has been coated internally or externally, or both, it may be heat set as an inflated tube. The conditions of heat setting should, however, be carefully chosen so that adequate heat setting is obtained together with sufficient drying of the coating to prevent blocking of the film on wind up. A preferred method of working is to melt extrude, quench and expand by the tubular method at a temperature below the melting point a tube of polypropylene, to slit the thus oriented tube of film and to then carry out the process of this invention using a stenter for heat setting and to dry the coating. In this way film defects, often associated with a tubular process which produces a film which is not a true plane surface are eliminated, e.g., length differences between the edges and centre of the film often referred to as "sag," or mild corrugations along the length of the film are largely eliminated during the drying step.

The coatings used in this invention may contain slip and/or antiblocking agents, such as dispersions of inorganic powders (e.g., calcium carbonate, magnesium carbonate or any other of the slip agents mentioned in our British specification No. 822,498), polyvinyl chloride or polypropylene or high melting waxes such as hydrogenated castor oil, stearamide, hydroxystearamide and ester type waxes. Also there may be used agents which may be incorporated into the base film or into the coating and which diffuse to the surface of the coating, e.g., slip agents such as oleamide and other unsaturated fatty acid amides having more than 8 carbon atoms in the molecule and antistatic agents such as 1-(hydroxyethyl)-2-n-alkyl glyoxalidines (e.g., "Nalcamine"–G11). The slip agents used as dispersions mentioned above may be coated onto the surface of the film after the heat seal coating has been applied. The polyolefine film base may contain antioxidants, dyes, pigments, lubricants and/or ultra-violet light stabilisers.

The films of this invention whether oriented by stretching in one or both directions may be used for most of the applications for which polyethylene, cellulose ester or polyethylene terephthalate films have been used, particularly because they are of high strength and clarity and can be used in thicknesses between .00025 inch and .01 inch. For instance, the coated films of the invention may be used as coated packaging films (oriented for overwrapping, bag-making, laminating, for baleable packs and bottle cap wads). More specifically, the films may be used for general wrapping of foodstuffs particularly greasy foodstuffs, soap powders, cigars, cigarettes, pipe tobacco, cement, textiles, greased and untreated machine parts, hardware, gifts and so on; packaging of articles to be sterilised, such as medicaments, pharmaceuticals, instruments, chemicals, gauze bandages, and the like and packaging of foodstuffs which may be heated in the package and stored.

Further applications include electrical uses such as capacitor windings, transformer insulation, slot lining, electrical tapes and insulation tapes and for cable lapping.

Various other electrical applications include small coils in the form of metal laminations for telephone and radio equipment, primary insulation for heat resistant wire, split mica insulating tape, i.e., mica sheets laminated between film, small condensers for instance having metal foil laminated to film or using vacuum metallised film, weather resistant electrical wire such as a conductor wrapped with film and coated with asphalt, wrapping for submerged pipe to insulate against ground currents, and laminations with paper to improve dielectric strength of the paper and other web materials.

They may be used for sound recording discs, tapes and magnetic tapes, i.e., sound or video tapes for general or computer use, particularly those types fabricated from one-way stretched film, asymmetrically two-way stretched or cross-laminated one-way stretched films.

They may be used for adhesive tapes, typewriter ribbons, textile threads, meteorological balloons, conveyor belting, book covers, as a release agent in moulding processes and parting sheets for low pressure laminating, for hot stamping foils, as mulches, for greenhouse glazing, and insulation and for glazing and insulation generally, e.g., as protective wrapping for rock wool insulation pads and bales, for concrete underlays and overlays, as temporary coverings in building operations, for acoustic tiles and pipe lagging, e.g., outside wrapping or inside liner for piping of all types, particularly plastic piping. They may be printed or dyed and may be laminated to glass and other films such as polyethylene, polyethylene terephthalate, polyvinyl chloride, and vinylidene chloride/vinyl chloride copolymers or to plastics generally and to rubbers. In particular they may be used as safety-glass interlayers, e.g., as an interlayer for laminating glass-to-glass or for laminating glass to polymethyl methacrylate; windows for containers and envelopes; transparent cans; container and bottle cap liners; laminations with metal foil to give metallic effects in fabrics; laminations with wood, paper or fabrics for pictures, book covers, wall protectors around light switches; wallpaper in clear, pigmented or printed form; millinery applications, for example, in braid form either alone or laminated to another film of a different colour; one-way stretched film for tear tapes for packages, e.g., cigarette packages; pressure sensitive tapes and adhesive tapes and transparent measuring tapes, particularly when made of one-way stretched film, asymmetrically two-way stretched film, or one-way stretched cross-laminated film.

Particularly when coated on one side only, they may also be used for drawing office purposes, e.g., as tracing cloths after sand blasting or other abrasive treatment to give a rough surface, and for graphic arts and photographic films, for black and white or colour photography and as polarising film (when containing a dichroic dyestuff and uniaxially stretched) for car headlights and windshields.

The following miscellaneous uses may also be mentioned: as a plastic binder for strengthening non-woven fabrics; fabric replacement for garment bags, shoulder covers, and the like; tubing for replacing metal tubing in various applications; protective devices such as face shields, goggles and the like, base film for metallising by vacuum deposition, sputtering or other techniques; ropes or belts fabricated by twisting and/or braiding ribbons or filaments; bacteriostatic applications for inhibiting mold growth, mildew or bacteria growth; barrier against diffusion of gases, e.g., as a barrier against diffusion of dichlorodifluoromethane from refrigerator systems; as a base sheet for deep drawing or forming operations, e.g., forming sheets into the shape of containers, dishes, plates and other hardware, cross-lamination of one-way stretched sheets employing a pigmented or coloured adhesive, the laminations being employed in window shades, awnings, tarpaulins, and the like and various other specific applications such as playing cards, greeting cards, milk bottle hoods, drinking straws, tying ribbon, tracing cloth, display and picnic dishes, disposable protectors against war gases, showcase covers, ground-sheets for tents, tent and car windows, and screens, printed charts, nomographs and scales, umbrellas, raincoats, file folders, refrigerator bags, tobacco pouches, drum heads, tops for convertible cars, car covers in shipment and storage, display card holders, ticker tape, protective covering for flash bulbs, bottle caps and window shades.

This invention is illustrated by the following examples.

*Example I*

A polypropylene film (.0005 inch thick) which had been oriented by tubular stretching in both directions at a (film) temperature in the range 120–170° C. with a stretch ratio of 8:1 in both directions was subjected to "Corona Discharge" treatment according to British Patent No. 715,914 so that the contact angle of water to the film was less than 90° and preferably less than 80° (72° being the optimum for this particular film).

A solution in methyl ethyl ketone (10–20% w./w.) of a copolymer of 80% (w./w.) vinyl chloride and 20% acrylonitrile was coated on to the film by passing the film through gravure rolls in a bath containing it. The film was then heat set and dried at 120° C. in a stenter, the time of passage through the stenter being 1 minute.

The coated film was tested for heat seal strength by making heat seals using the hot bar method at 150° C., 30 p.s.i. and 2 seconds contact time for the sealing, and then measuring the force required to peel one inch wide strips apart. The results are set out in Table 1.

TABLE 1

| Sample | Coating | | Heat Seal Strength, gm./inch |
|---|---|---|---|
| | Thickness, inch | Gm./m.$^3$ | |
| Control (no treatment to improve bonding properties). | .00006 | 2.4 | 280 |
| | .00012 | 4.8 | 400 |
| Film treated by "Corona Discharge." | .00006 | 2.4 | 460 |
| | .00012 | 4.8 | 680 |

*Example II*

An oriented polypropylene film prepared and "Corona Discharge" treated as in Example 1 was coated, by application by gravure rolls to it, with an emulsion containing 40–50% (w./w.) of a copolymer of 90% (w./w.) vinylidene chloride and 10% acrylonitrile having a particle size range of 0.05 to 0.2$\mu$ and 2% w./w. of polyvinyl chloride (particle size 0.4 to 1$\mu$) added as a slip agent. The emulsion was prepared by emulsion polymerisation of the vinylidene chloride and acrylonitrile in the presence of sodium lauryl sulphate as a emulsifying agent. The coated film was passed through a stenter at a temperature of 150° C., the time of passage being about ½ minute. The film was tested for heat seal strength as in Example I to give results set out in Table 2.

TABLE 2

| Sample | Coating | | Heat Seal Strength, gm./inch |
|---|---|---|---|
| | Thickness, inch | Gm./m.³ | |
| 1 | .00004 | 1.6 | 70 |
| 2 | .00006 | 2.3 | 170 |
| 3 | .000125 | 5.0 | 360 |

We claim:

1. A method for the preparation of coated films of crystallisable polypropylene which comprises treating a film of said polypropylene which has been stretched to orient it, but not heat set, to improve the bonding properties of its surface, by exposing the surface of the film to a high voltage electrical stress accompanied by corona discharge in the presence of oxygen, coating the film with a polymeric heat seal coating which can be heat sealed at a temeprature below 170° C., and then heat setting the coated film at a temperature in the range 75° C. to the melting point while controlling the dimensions of the film so that it does not shrink more than 15% and under conditions of time and temperature sufficient to dry the coating and to reduce the linear shrinkage in any direction in the plane of the film to less than 6% when heated for 1 minute at 120° C.

2. A method according to claim 1 in which the polymeric heat seal coating comprises a copolymer of vinylidene chloride and acrylonitrile.

3. A method according to claim 2 in which the polymeric heat seal coating comprises a copolymer of from 80% to 95% by weight of vinylidene chloride and up to 20% by weight of acrylonitrile.

4. A method according to claim 1 in which the polymeric heat seal coating is applied by a solution coating technique.

5. A method according to claim 1 in which the polymeric heat seal coating is applied as an aqueous dispersion of the polymeric material stabilised by an emulsifying agent.

6. A method according to claim 1 in which the heat setting treatment is carried out using a setting oven temperature in the range 130 to 165° C.

7. A method according to claim 1 in which a linear shrinkage of up to 15% is permitted during the heat setting treatment.

8. A method according to claim 1 in which the heat setting treatment is carried out in a stenter.

9. A method according to claim 1 in which the heat setting treatment is carried out on an inflated tube of the polypropylene film.

10. A method of producing a coated olefin polymer film according to claim 1, in which the polypropylene is melt extruded and expanded by the tubular method at a temperature below the melting point of the polypropylene whereby a biaxially oriented film is produced and the tube is slit, subjected to the said treatment for improving the bonding properties of its surface, coated with the said polymeric heat seal coating and then heat set in a stenter.

References Cited by the Examiner

UNITED STATES PATENTS

| 2,998,324 | 8/1961 | Hirt | 117—47 X |
| 3,022,543 | 2/1962 | Baird et al. | 117—47 X |
| 3,031,332 | 4/1962 | Rothacker | 117—47 |
| 3,041,208 | 6/1962 | Hay et al. | 117—138.8 |
| 3,088,844 | 5/1963 | Hungerford et al. | 117—47 X |

ALFRED L. LEAVITT, *Primary Examiner.*

JOSEPH B. SPENCER, RICHARD D. NEVIUS, MURRAY KATZ, *Examiners.*

D. E. TOWNSEND, C. A. HAASE, A. H. ROSENSTEIN, *Assistant Examiners.*